United States Patent
Nishiyama

(10) Patent No.: US 11,964,737 B2
(45) Date of Patent: Apr. 23, 2024

(54) SHIP INFORMATION DISPLAYING SYSTEM, SHIP INFORMATION DISPLAYING METHOD AND IMAGE GENERATING DEVICE

(71) Applicant: Furuno Electric Co., Ltd., Hyogo (JP)

(72) Inventor: Koji Nishiyama, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 62 days.

(21) Appl. No.: 17/688,452

(22) Filed: Mar. 7, 2022

(65) Prior Publication Data

US 2022/0185435 A1 Jun. 16, 2022

Related U.S. Application Data

(63) Continuation-in-part of application No. PCT/JP2020/030345, filed on Aug. 7, 2020.

(30) Foreign Application Priority Data

Sep. 9, 2019 (JP) .................................. 2019-163871

(51) Int. Cl.
*G08G 3/00* (2006.01)
*B63B 49/00* (2006.01)
(Continued)

(52) U.S. Cl.
CPC .............. *B63B 49/00* (2013.01); *B63B 79/20* (2020.01); *G06T 7/70* (2017.01); *G06T 15/205* (2013.01);
(Continued)

(58) Field of Classification Search
USPC ... 340/984, 990–994, 995.1, 995.12, 995.17, 340/429, 426.22, 525, 539.3, 672, 691.6
See application file for complete search history.

(56) References Cited

U.S. PATENT DOCUMENTS

| | | | | |
|---|---|---|---|---|
| 2004/0021680 A1* | 2/2004 | Hara | ........................ | G09G 5/00 |
| | | | | 715/700 |
| 2014/0253597 A1* | 9/2014 | Dohi | .................... | G01C 21/203 |
| | | | | 345/656 |

(Continued)

FOREIGN PATENT DOCUMENTS

| | | |
|---|---|---|
| CN | 101038168 A | 9/2007 |
| JP | 2011225208 A | 11/2011 |

(Continued)

OTHER PUBLICATIONS

ISA Japan Patent Office, International Search Report Issued in Application No. PCT/JP2020030345, dated Sep. 29, 2020, WIPO, 4 pages.

(Continued)

*Primary Examiner* — Daniel Previl
(74) *Attorney, Agent, or Firm* — Alleman Hall & Tuttle LLP

(57) ABSTRACT

A ship information displaying system can easily grasp the size of a ship intuitively. The system includes a position detector that detects a position of a ship and generates positional data, a direction detector that detects a heading of the ship and generates directional data, a memory that stores size data indicative of a flat dimension of the ship on the basis of a detected location of the positional data in the ship, processing circuitry that places a ship object indicative of the ship at a position in a virtual three-dimensional space corresponding to the positional data, with an orientation corresponding to the directional data and a size corresponding to the size data and that generates an image containing the ship object by rendering a scene based on a viewpoint position and a line-of-sight direction set in the virtual three-dimensional space, and a display that displays the image.

16 Claims, 8 Drawing Sheets

(51) Int. Cl.
  *B63B 79/20*   (2020.01)
  *G06T 7/70*    (2017.01)
  *G06T 15/20*   (2011.01)
  *G06T 19/00*   (2011.01)
  *G06V 20/56*   (2022.01)

(52) U.S. Cl.
  CPC ............ *G06T 19/006* (2013.01); *G06V 20/56* (2022.01); *G06T 2207/30252* (2013.01)

(56) References Cited

U.S. PATENT DOCUMENTS

| | | | | |
|---|---|---|---|---|
| 2014/0354466 | A1* | 12/2014 | Nomura | G01S 13/937 342/146 |
| 2015/0350552 | A1  | 12/2015 | Pryszo et al. | |
| 2017/0253308 | A1* | 9/2017  | Morita | G01S 7/12 |
| 2019/0163984 | A1  | 5/2019  | Shinohe | |
| 2020/0089234 | A1* | 3/2020  | Nishiyama | G06T 15/20 |
| 2020/0090367 | A1* | 3/2020  | Nishiyama | G06T 15/20 |
| 2020/0090414 | A1* | 3/2020  | Nishiyama | G08G 3/02 |

FOREIGN PATENT DOCUMENTS

| | | |
|---|---|---|
| JP | 2018188043 A | 11/2018 |
| KR | 20150125862 A | 11/2015 |
| WO | 2018216537 A1 | 11/2018 |
| WO | 2019093416 A1 | 5/2019 |
| WO | 2019096401 A1 | 5/2019 |
| WO | 2019130940 A1 | 7/2019 |

OTHER PUBLICATIONS

De Vlaming, A. et al., "Augmented reality used in navigation.", Netherlands Maritime University, Feb. 5, 2013, 25 pages.

European Patent Office, Extended European Search Report Issued in Application No. 20862345.4, dated Sep. 15, 2023, Germany, 7 pages.

* cited by examiner

SHIP INFORMATION DISPLAYING SYSTEM, SHIP INFORMATION DISPLAYING METHOD AND IMAGE GENERATING DEVICE

TECHNICAL FIELD

The present disclosure relates to a ship information displaying system, a ship information displaying method, an image generating device, and a program.

BACKGROUND ART

Patent Document 1 discloses a ship navigation support device including a plurality of imaging parts (cameras) which are installed in a ship and images the circumference of a ship so that a plurality of captured images are overlapped with each other, an image synthesizing part which synthesizes the images captured by the imaging part on the basis of a given virtual viewpoint V, a measuring part (millimeter wave radar) which measures a distance from the ship to a quay, a correcting part (controller) which corrects the distance from the ship to the quay measured by the measuring part into a distance from the ship to the quay when seen from the virtual viewpoint, an image outputting part which outputs an image obtained by superimposing the distance from the ship to the quay corrected by the correcting part on the image synthesized by the image synthesizing part, and a display which displays the image outputted from the image outputting part.

REFERENCE DOCUMENT OF CONVENTIONAL ART

Patent Document

Patent Document 1 JP2018-188043A

DESCRIPTION OF THE DISCLOSURE

Problem to be Solved by the Disclosure

Meanwhile, for example, when a ship arrives at and departs from a shore, although it is necessary to grasp a distance between the edge of the ship and a circumference object, such as a quay or a tugboat, since the view of a sailor who is on the ship is interrupted by the sun deck and the ship edge near the water surface cannot be visually recognized, it is difficult to intuitively grasp the size of the ship. Such a problem is especially remarkable in large-sized ships.

The present disclosure is made in view of the above-described problem, and one purpose thereof is to provide a ship information displaying system, a ship information displaying method, an image generating device, and a program, which can easily and intuitively grasp the size of a ship.

Means for Solving the Problem

In order to solve the problem, a ship information displaying system according to one aspect of the present disclosure includes a position detector, a direction detector, a memory, an object placing module, an image generating module, and a display. The position detector detects a position of a ship and generates positional data. The direction detector detects a heading of the ship and generates directional data. The memory stores size data indicative of a flat dimension of the ship on the basis of a detected location of the positional data in the ship. The object placing module places a ship object indicative of the ship at a position in a virtual three-dimensional space corresponding to the positional data, with an orientation corresponding to the directional data and a size corresponding to the size data. The image generating module generates an image containing the ship object by rendering a scene based on a viewpoint position and a line-of-sight direction set in the virtual three-dimensional space. The display displays the image.

Further, a method of displaying ship information according to another aspect of the present disclosure includes the steps of detecting a position of a ship and generating positional data, detecting a heading of the ship and generating directional data, acquiring size data indicative of a flat dimension of the ship on the basis of a detected location of the positional data in the ship, placing a ship object indicative of the ship at a position in a virtual three-dimensional space corresponding to the positional data, with an orientation corresponding to the directional data and a size corresponding to the size data, generating an image containing the ship object by rendering a scene based on a viewpoint position and a line-of-sight direction set in the virtual three-dimensional space, and displaying the image.

Further, an image generating device according to another aspect of the present disclosure includes a position acquiring module, a direction acquiring module, a size acquiring module, an object placing module, and an image generating module. The position acquiring module acquires positional data indicative of a position of a ship. The direction acquiring module acquires directional data indicative of a heading of the ship. The size acquiring module acquires size data indicative of a flat dimension of the ship on the basis of a detected location of the positional data in the ship. The object placing module places a ship object indicative of the ship at a position in a virtual three-dimensional space corresponding to the positional data, with an orientation corresponding to the directional data and a size corresponding to the size data. The image generating module generates an image containing the ship object by rendering a scene based on a viewpoint position and a line-of-sight direction set in the virtual three-dimensional space.

Further, a program according to another aspect of the present disclosure causes a computer to function as a position acquiring module, a direction acquiring module, a size acquiring module, an object placing module, and an image generating module. The position acquiring module acquires positional data indicative of a position of a ship. The direction acquiring module acquires directional data indicative of a heading of the ship. The size acquiring module acquires size data indicative of a flat dimension of the ship on the basis of a detected location of the positional data in the ship. The object placing module places a ship object indicative of the ship at a position in a virtual three-dimensional space corresponding to the positional data, with an orientation corresponding to the directional data and a size corresponding to the size data. The image generating module generates an image containing the ship object by rendering a scene based on a viewpoint position and a line-of-sight direction set in the virtual three-dimensional space.

Effect of the Disclosure

According to the present disclosure, it becomes easier to grasp the size of a ship intuitively.

MODE FOR CARRYING OUT THE DISCLOSURE

Hereinafter, one embodiment of the present disclosure is described with reference to the drawings.

Figure 1:
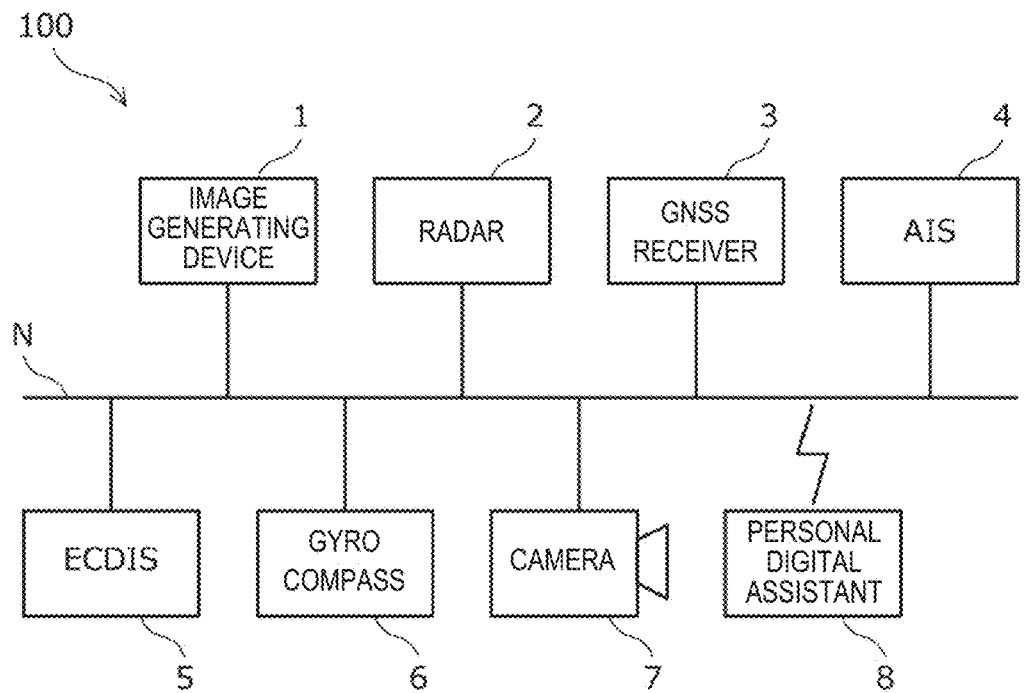
FIG. 1 is a block diagram illustrating one example of a configuration of a ship information displaying system according to one embodiment.

FIG. 1 is a block diagram illustrating one example of a configuration of a ship information displaying system 100 according to this embodiment.

The ship information displaying system 100 may include an image generating device 1, a radar 2, a GNSS receiver 3, an AIS 4, an ECDIS 5, a gyrocompass 6, a camera 7, and a personal digital assistant 8. These apparatuses may be connected to a network N, such as LAN (Local Area Network), and network communication is possible therebetween, for example.

The image generating device 1 may generate video data containing an image which expresses a situation around a ship (the ship) in extended reality or augmented reality (AR), and display the data on its display 22 (see FIG. 2) or a display of the personal digital assistant 8.

The radar 2 may detect a target (object) which exists around the ship, and generate target tracking data (TT data) indicative of a position and a velocity vector of the target.

The GNSS receiver 3 may detect the position of the ship based on radio waves received from a GNSS (Global Navigation Satellite System), and generate positional data indicative of the position of the ship. The GNSS receiver 3 is one example of a position detector.

The AIS (Automatic Identification System) 4 may receive AIS data transmitted from a base station on another ship or land. The AIS data may contain various data, such as the name of another ship, an identifier, a position, a length, a width, a course, a ship speed, a heading, and a destination.

The AIS 4 is one example of an another ship data receiver, and the AIS data is one example of another ship data.

The ECDIS (Electronic Chart Display and Information System) 5 may acquire the positional data of the ship from the GNSS receiver 3, and display the position of the ship on an electronic nautical chart. Further, the ECDIS 5 may also display, on the electronic nautical chart, a scheduled traveling route set so as to sequentially follow a plurality of way points.

The gyrocompass 6 may detect the heading of the ship and generate directional data indicative of the heading. The gyrocompass 6 is one example of a direction detector. Without being limited to this configuration, a GPS compass or a magnetic compass may be used, for example.

The camera 7 may image outside the ship and generate an image (hereinafter, referred to as a "camera image"). The camera 7 is installed at the bridge so as to be oriented toward the heading of the ship, for example. The camera 7 may be configured to be panned or tilted corresponding to an operational input detected by a user interface 21 (see FIG. 2) of the image generating device 1.

The personal digital assistant 8 may be carried by a sailor and display the image generated by the image generating device 1. The personal digital assistant 8 is a tablet computer, for example. For example, the personal digital assistant 8 is connected wirelessly with the network N via an access point (not illustrated).

In this embodiment, each apparatus included in the ship information displaying system 100 may be mounted on the ship. Without being limited to this configuration, for example, the image generating device 1 may be disposed at a control tower on land, and the personal digital assistant 8 may be carried by a sailor of the tugboat or a worker on the quay.

Figure 2:
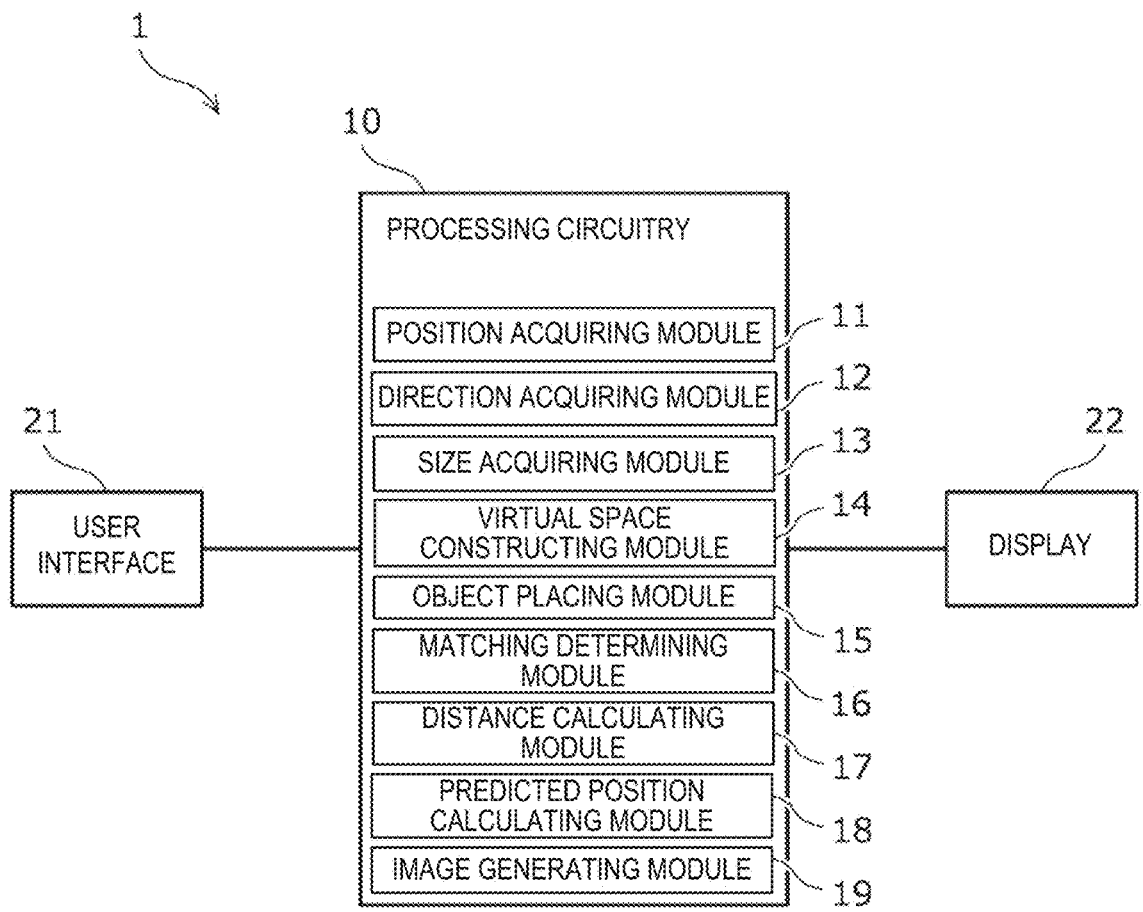
FIG. 2 is a block diagram illustrating one example of a configuration of an image generating device according to this embodiment.

FIG. 2 is a block diagram illustrating one example of a configuration of the image generating device 1 according to this embodiment. The image generating device 1 may include a processing circuitry 10, the user interface 21, and the display 22.

The processing circuitry 10 may be a computer including a CPU, a RAM, a ROM, a nonvolatile memory, and an input/output interface. The CPU of the processing circuitry 10 may perform information processing according to a program loaded to the RAM from the ROM or the nonvolatile memory.

The program may be supplied, for example, via an information storage medium, such as an optical disc or a memory card, or may be supplied, for example, via a communication network, such as the Internet or a LAN.

The memory, such as the nonvolatile memory of the processing circuitry 10, may store various data used for the information processing according to the program, in addition to the program.

The processing circuitry 10 may include a position acquiring module 11, a direction acquiring module 12, a size acquiring module 13, a virtual space constructing module 14, an object placing module 15, a matching determining module 16, a distance calculating module 17, a predicted position calculating module 18, and an image generating module 19. These function parts may be implemented by the CPU of the processing circuitry 10 executing the information processing according to the program.

The user interface 21 is a pointing device, such as a trackball, for example. The display 22 is a display device, such as a liquid crystal display, for example.

The position acquiring module 11 may acquire the positional data indicative of the position of the ship generated by the GNSS receiver 3. The direction acquiring module 12 may acquire the directional data indicative of the heading of the ship generated by the gyrocompass 6.

The size acquiring module 13 may acquire size data of the ship from the memory of the processing circuitry 10. Without being limited to this configuration, the size data may be acquired from an external database.

The virtual space constructing module 14 may build a virtual three-dimensional space, and set a viewpoint position and a Line-of-Sight (LoS) direction of a virtual camera. The object placing module 15 may place various kinds of virtual objects in the virtual three-dimensional space.

The matching determining module 16, the distance calculating module 17, and the predicted position calculating module 18 will be described later in detail.

The image generating module 19 may generate an extension image by rendering (drawing) a scene (spectacle) of the virtual three-dimensional space imaged by the virtual camera. Further, the image generating module 19 may generate a synthesized image by synthesizing the extension image to the camera image indicative of a scene of an actual space imaged by the actual camera 7.

Figure 3:
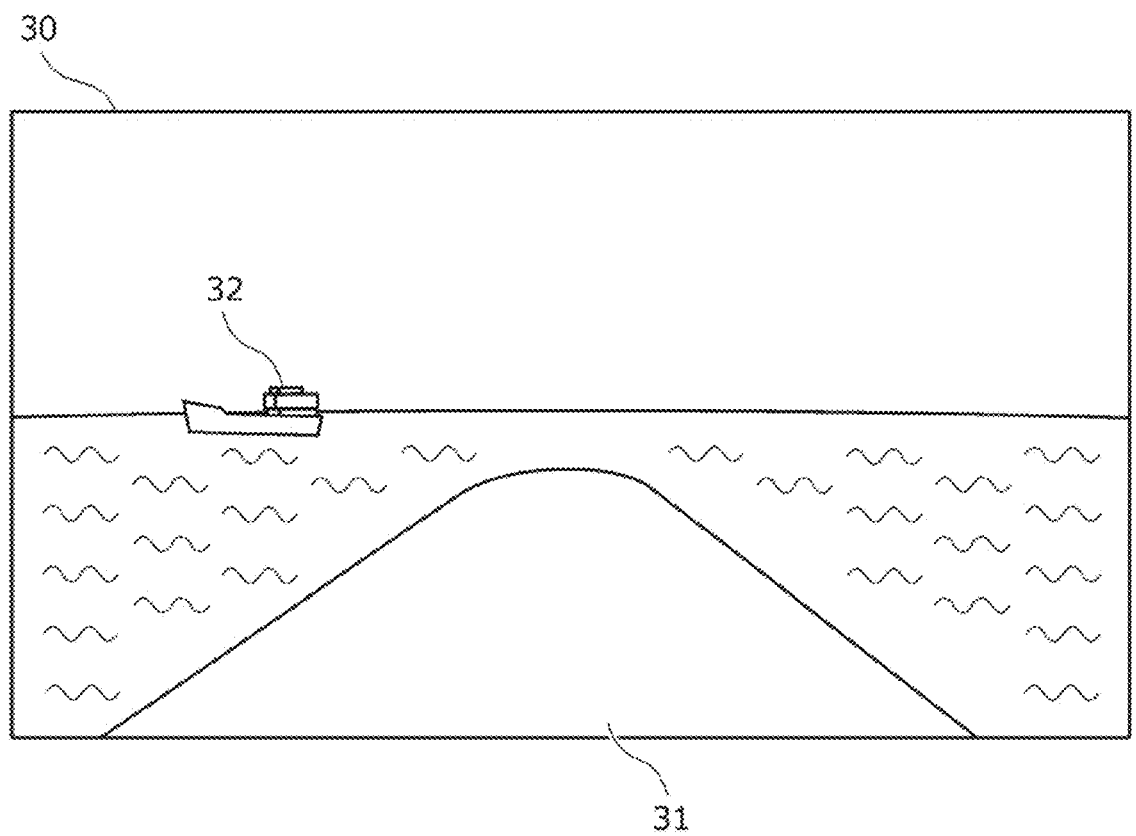
FIG. 3 is a view illustrating one example of a camera image captured by a camera.

FIG. 3 is a view illustrating one example of a camera image 30 captured by the camera 7. The example of this drawing illustrates the camera image 30 when the camera 7 is installed at the bridge of the ship so that it is oriented toward the heading of the ship. The camera image 30 contains an image 31 of the ship and an image 32 of another ship, for example.

Figure 4:
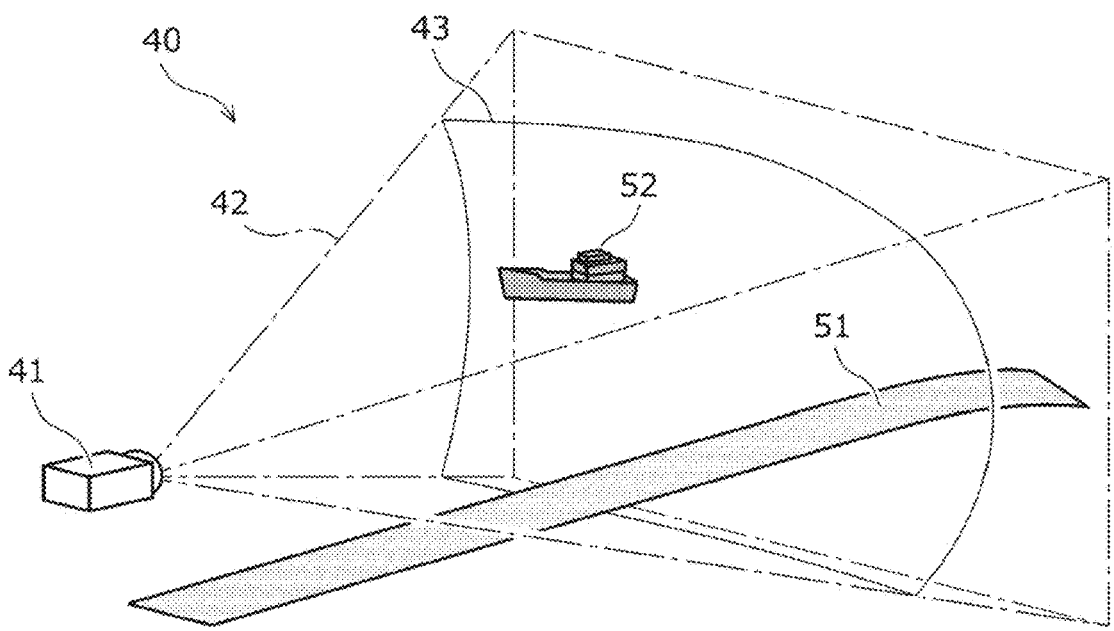
FIG. 4 is a view illustrating one example of a virtual three-dimensional space.

FIG. 4 is a view illustrating one example of a virtual three-dimensional space 40 built by the virtual space constructing module 14. The coordinate system of the virtual three-dimensional space 40 may be set corresponding to the coordinate system of the actual space.

A virtual camera 41 may be disposed in the virtual three-dimensional space 40. The viewpoint position and the LoS direction may be set to the virtual camera 41. A scene contained in a field of view 42 based on the viewpoint position and the LoS direction of the virtual camera 41 may be a target of the rendering.

The viewpoint position and the LoS direction of the virtual camera 41 are set corresponding to the position and the orientation of the actual camera 7, for example. For this reason, the LoS direction of the virtual camera 41 may change in an interlocking manner with the ship's heading. Further, when the actual camera 7 pans or tilts, the LoS direction of the virtual camera 41 may also change accordingly.

A screen 43 may be disposed in the virtual three-dimensional space 40. The screen 43 may be an area corresponding to the position and the orientation of the actual camera 7, and may be an area where the camera image 30 (see FIG. 3) captured by the camera 7 is synthesized. The screen 43 may be disposed so that it is normally contained in the field of view 42 of the virtual camera 41 neither too much nor too little.

Virtual objects, such as a route object 51 and an another ship object 52 may be disposed in the virtual three-dimensional space 40. The route object 51 may be disposed based on data of the scheduled traveling route acquired from the ECDIS 5. The another ship object 52 may be disposed based on the AIS data acquired from the AIS 4 (one example of another ship data).

For example, the another ship object 52 is disposed at a position corresponding to the positional data contained in the AIS data, with a size corresponding to length and width data, and in an orientation corresponding to the heading data. The another ship object 52 may have a three-dimensional shape which imitates the shape of the ship so that it is possible to easily grasp the bow direction at a glance.

Figure 5:
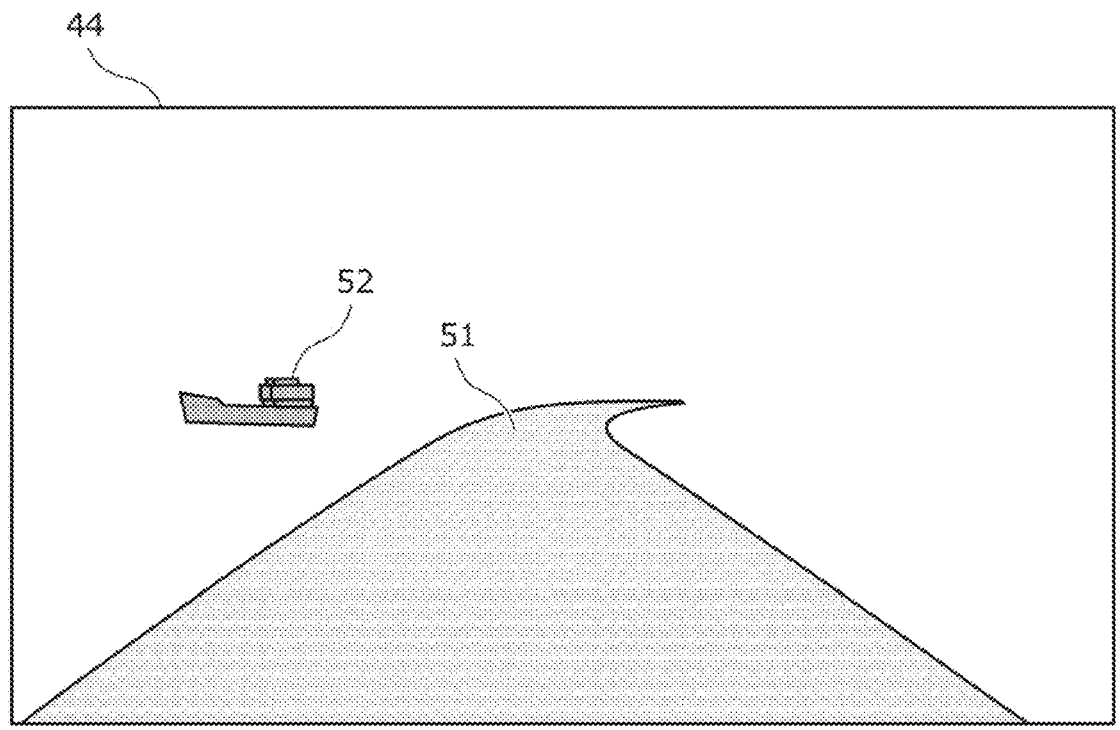
FIG. 5 is a view illustrating one example of an extension image generated by rendering.

FIG. 5 is a view illustrating one example of an extension image 44 generated by the image generating module 19. The image generating module 19 may generate the extension image 44 containing the virtual objects, such as the route object 51 and the another ship object 52, by rendering the scene imaged by the virtual camera 41 in the virtual three-dimensional space 40.

In the extension image 44, the virtual objects, such as the route object 51 and the another ship object 52, may be objects having transparency (for example, translucent). In the extension image 44, the background area other than the virtual objects may fully be transparent.

Figure 6:
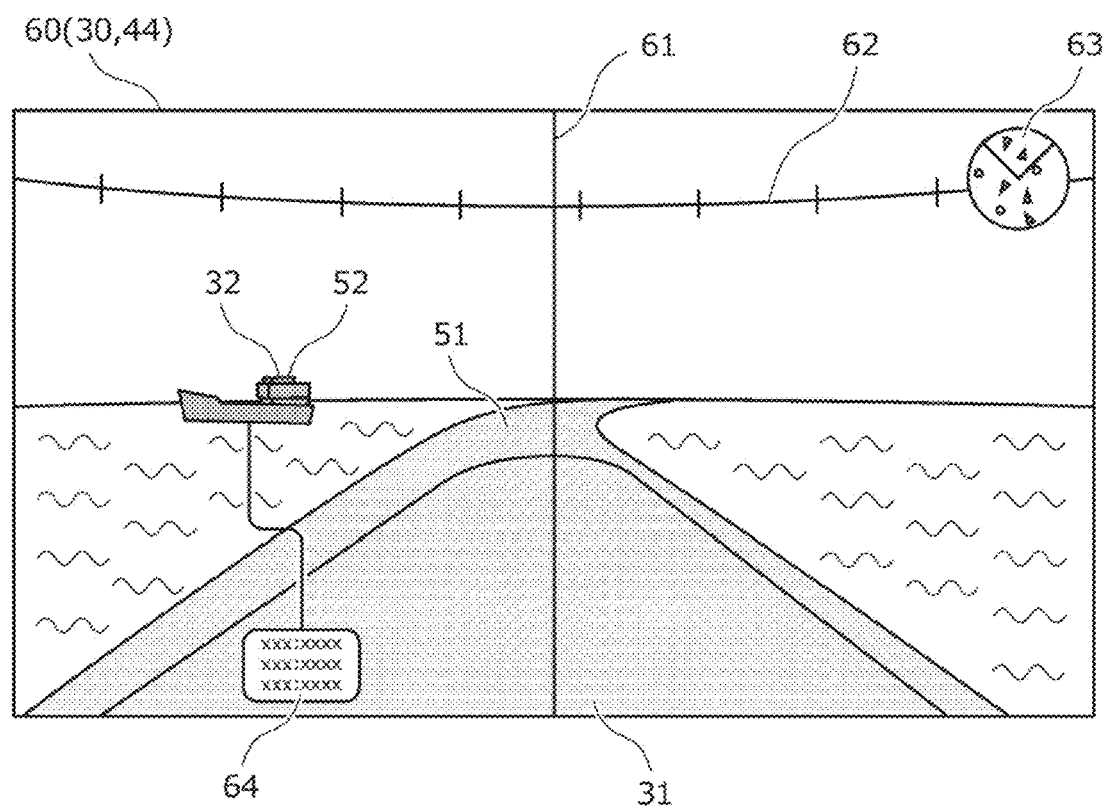
FIG. 6 is a view illustrating one example of a synthesized image where the camera image and the extension image are synthesized.

FIG. 6 is a view illustrating one example of a synthesized image 60 which is generated by the image generating module 19, where the camera image 30 and the extension image 44 are synthesized.

The synthesized image 60 may contain the another ship object 52 which is superimposed on the image 32 of another ship. As described above, since the route object 51 and the another ship object 52 have transparency, the image 31 of the ship, and the image 32 of another ship can be visually recognized, even if the route object 51 and the another ship object 52 are overlapped therewith.

The synthesized image 60 may contain a heading line 61, an azimuth scale 62, a circumference indication 63, and an another ship information indication 64.

The heading line 61 may be an indication which illustrates the heading of the ship, and may be generated based on the directional data from the gyrocompass 6. The circumference indication 63 may be an indication which illustrates a situation of target(s) around the ship, and may be generated based on the TT data from the radar 2. The another ship information indication 64 may be an indication which illustrates information on another ship, and may be generated based on the AIS data from the AIS 4.

Note that the viewpoint position and the LoS direction of the virtual camera 41 in the virtual three-dimensional space 40 may change in an interlocking manner at the position and the posture of the personal digital assistant 8 carried by the sailor, for example.

Figure 7:
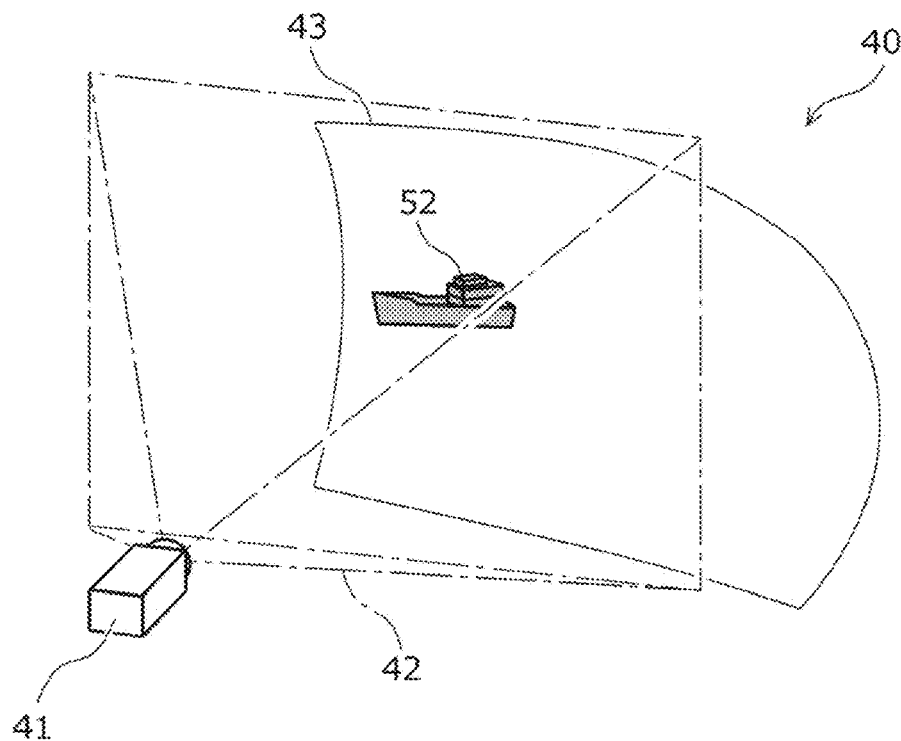
FIG. 7 is a view illustrating one example of the virtual three-dimensional space.
Figure 8:
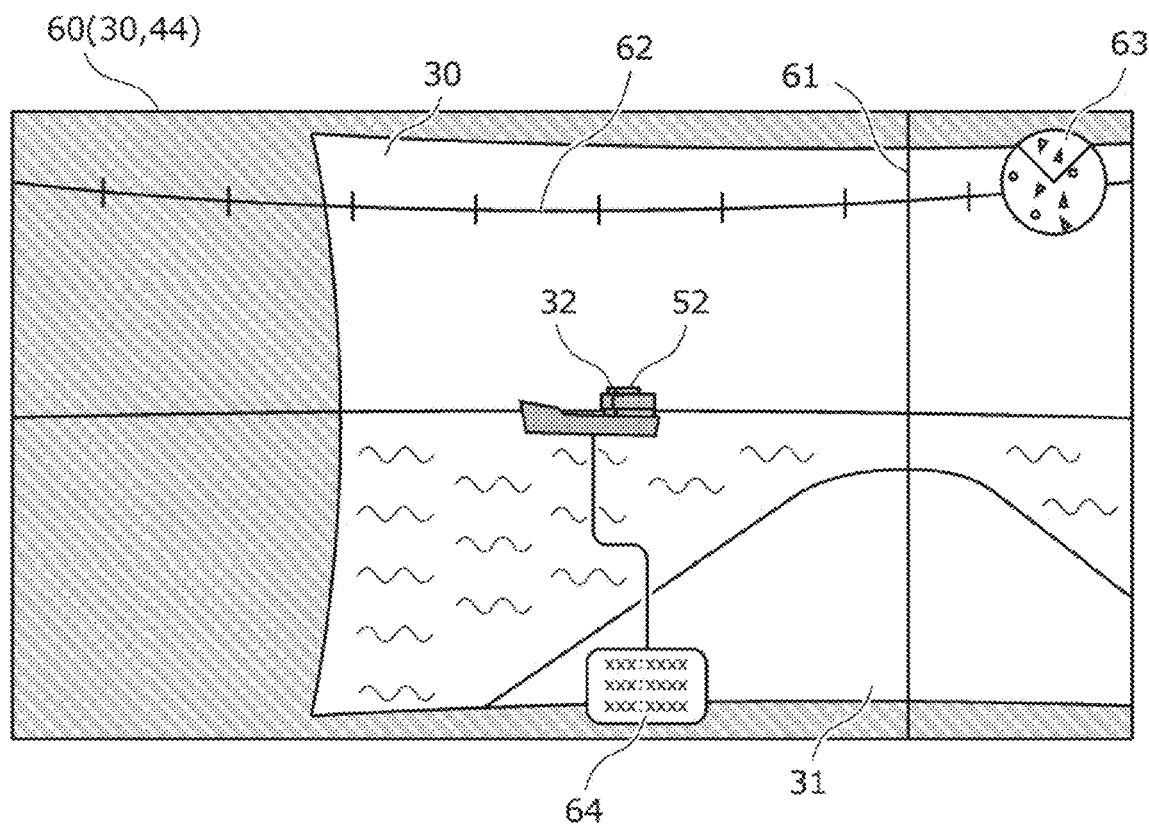
FIG. 8 is a view illustrating one example of the synthesized image where the camera image and the extension image are synthesized.

In that case, as illustrated in FIG. 7, a situation where the field of view 42 of the virtual camera 41 does not match with the screen 43 may occur. As illustrated in FIG. 8, in the synthesized image 60, the camera image 30 is synthesized only with an area which is a part of the extension image 44, and the background of the extension image 44 is displayed on other areas.

Figure 9:
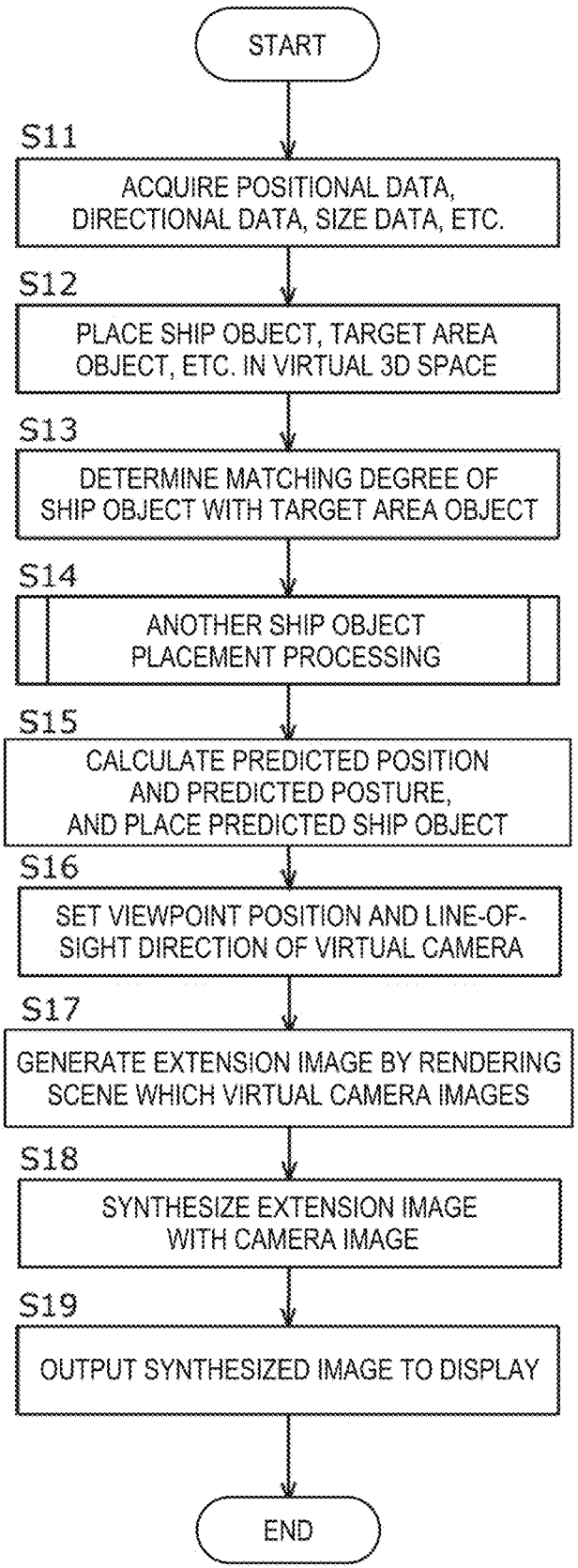
FIG. 9 is a flowchart illustrating one example of a procedure of a ship information displaying method according to this embodiment.
Figure 10:
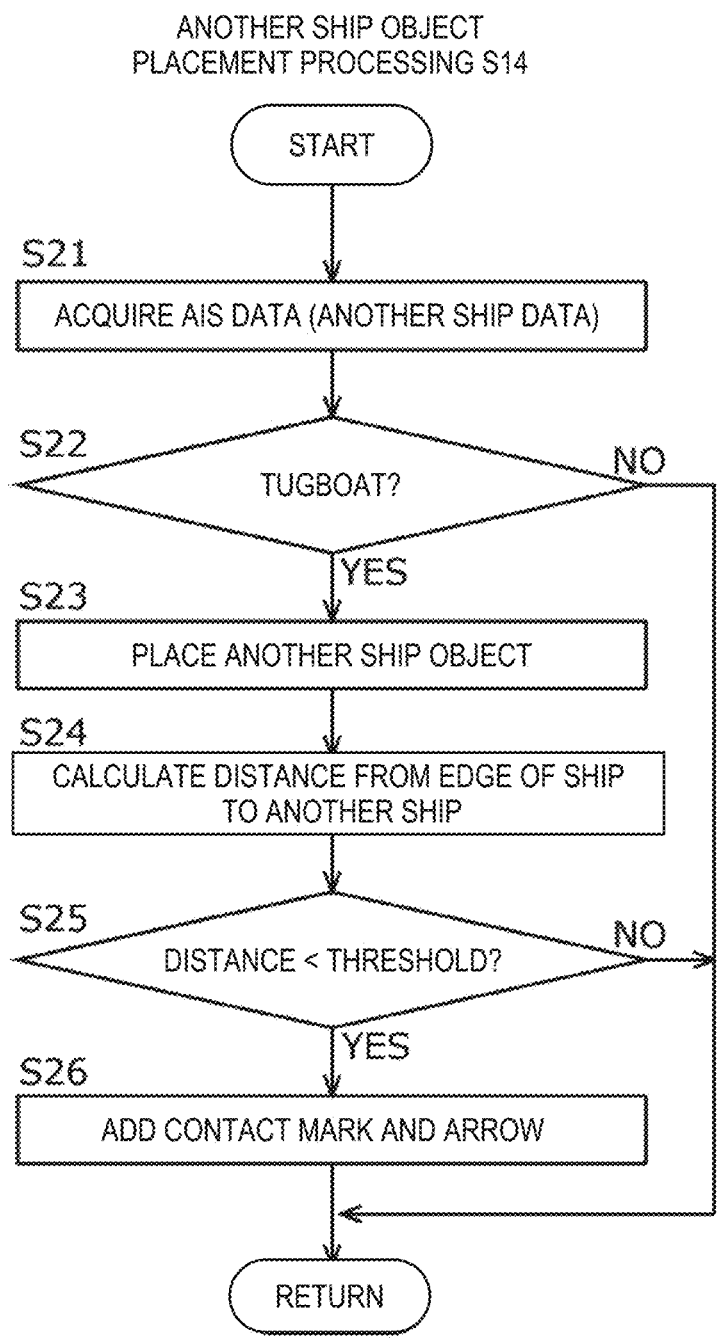
FIG. 10 is a flowchart illustrating one example of a procedure of another ship object placement processing.

FIGS. 9 and 10 are flowcharts illustrating one example of a procedure of a ship information displaying method according to this embodiment, which is implemented by the ship information displaying system 100. The information processing illustrated in these drawings is performed, for example, when the ship arrives at or departs from a quay or a pier in a port.

Figure 11:
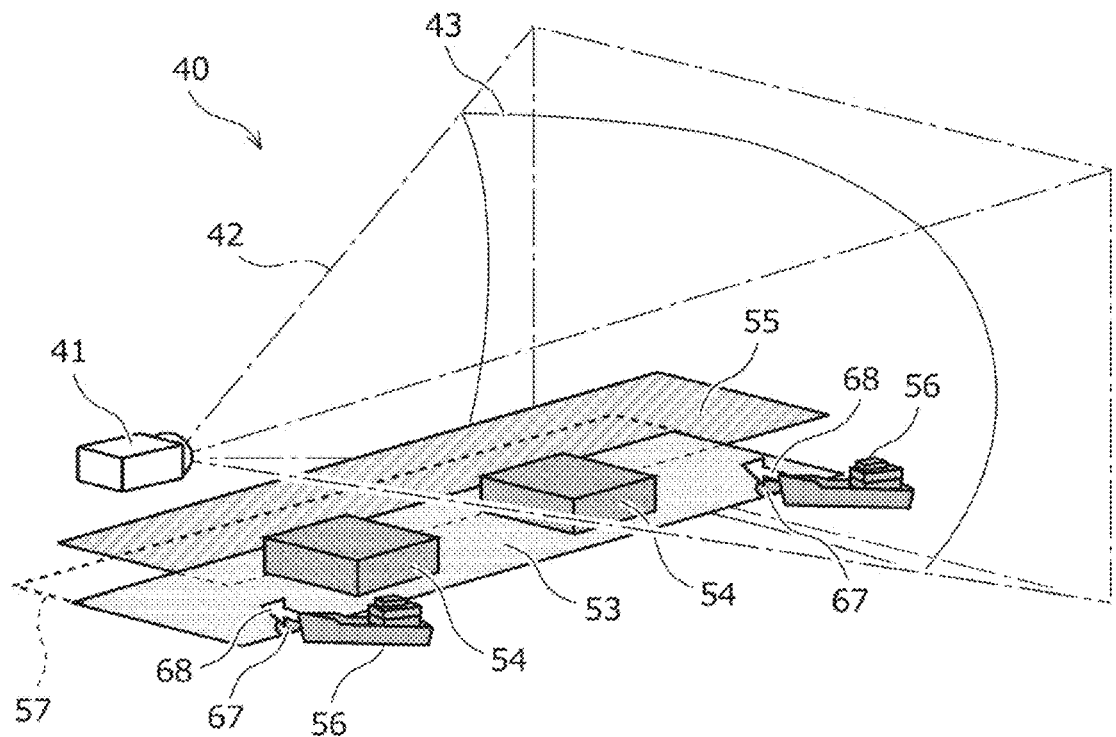
FIG. 11 is a view illustrating one example of the virtual three-dimensional space.
Figure 12:
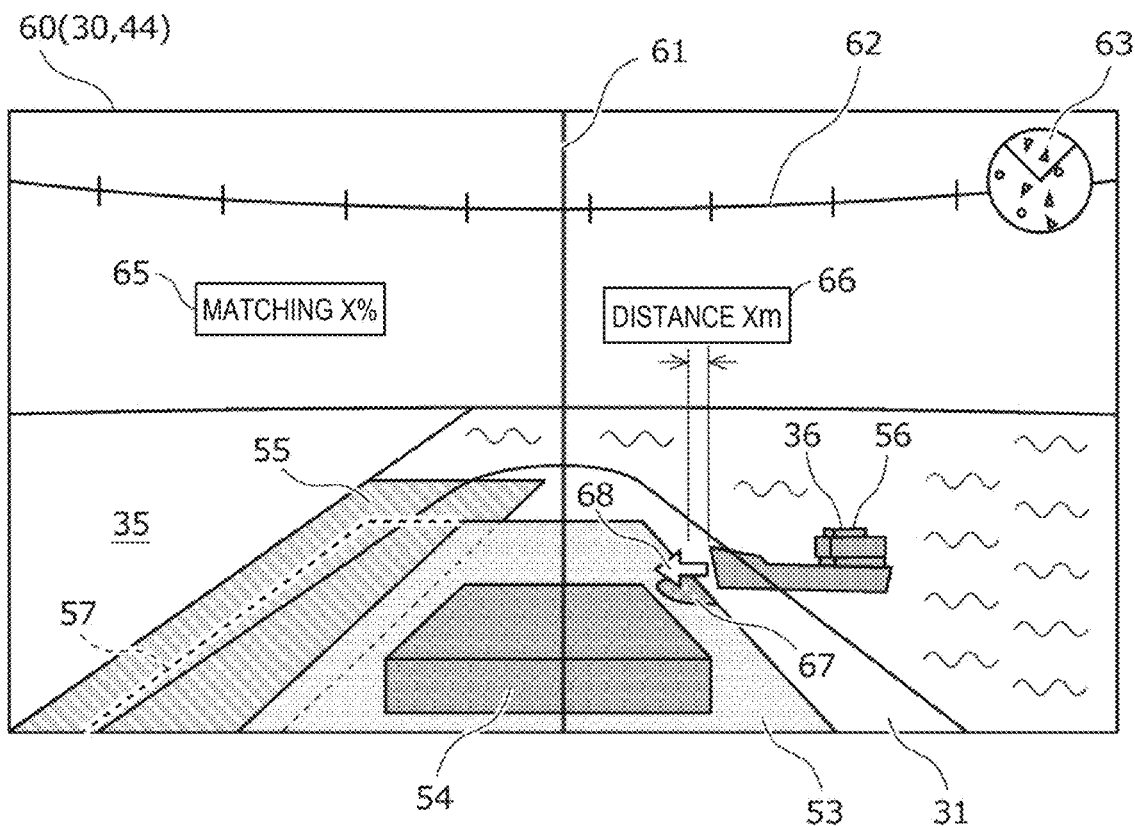
FIG. 12 is a view illustrating one example of a synthesized image where the camera image and the extension image are synthesized.

FIGS. 11 and 12 are views illustrating one example of the virtual three-dimensional space 40 and the synthesized image 60 when performing the information processing illustrated in FIGS. 9 and 10. These drawings indicate a situation where the ship is pushed by a tugboat and is stored in an arrival-at-a-shore area.

By performing the information processing illustrated in FIGS. 9 and 10 according to the program, the processing circuitry 10 of the image generating device 1 may function as the position acquiring module 11, the direction acquiring module 12, the size acquiring module 13, the virtual space constructing module 14, the object placing module 15, the matching determining module 16, the distance calculating module 17, the predicted position calculating module 18, and the image generating module 19, which are illustrated in FIG. 2.

First, the processing circuitry 10 may acquire the positional data, the directional data, the size data, etc. (S11; processing as the position acquiring module 11, the direction acquiring module 12, and the size acquiring module 13). In detail, the processing circuitry 10 may acquire the positional data indicative of the position of the ship from the GNSS receiver 3, acquire the directional data indicative of the heading of the ship from the gyrocompass 6, and acquire the size data of the ship from its own memory.

Figure 13:
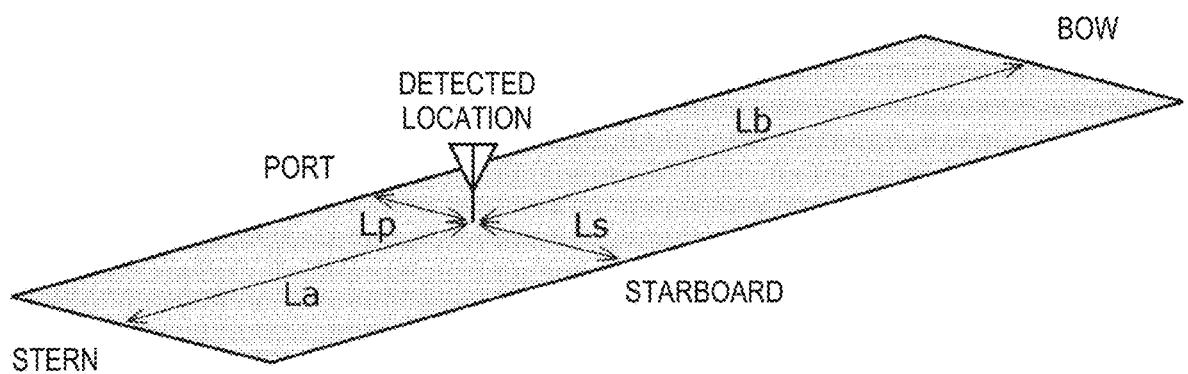
FIG. 13 is a view illustrating size data.

Here, the size data may indicate a flat dimension of the ship on the basis of a detected location of the positional data in the ship. The detected location of the positional data may be a position of the antenna of the GNSS receiver 3. For example, as illustrated in FIG. 13, the size data contains, in a condition where the ship has a rectangular flat surface contour, a length Lb from the detected location to the bow, a length Lp from the detected location to the port side, a length Ls from the detected location to the starboard side, and a length La from the detected location to the stern.

Next, the processing circuitry 10 may place a ship object 53 and a target area object 55 in the virtual three-dimensional space 40 (S12; processing as the object placing module 15: see FIG. 11).

In detail, the processing circuitry 10 may place the ship object 53 indicative of the ship at a position corresponding to the positional data in the virtual three-dimensional space 40, with an orientation corresponding to the directional data and a size corresponding to the size data.

For example, the ship object 53 is disposed so that a point corresponding to the detected location (see FIG. 13) is located at coordinates corresponding to the positional data. Further, the ship object 53 may be disposed so that a front end corresponding to the bow is oriented toward a direction corresponding to the directional data.

Moreover, the ship object 53 may be generated as a rectangular object having such a size that lengths from the point corresponding to the detected location to the front end, the left end, the right end, and the rear end correspond to the lengths Lb, Lp, Ls, and La (see FIG. 13) contained in the size data.

The ship object 53 may be a flat surface object (that is, an object without thickness). Further, the ship object 53 may be disposed at a height corresponding to the water surface.

Moreover, the processing circuitry 10 may place a heavy object 54 indicative of a heavy article mounted on the ship on the ship object 53. The heavy object 54 indicates a loaded object or an engine carried in the ship, for example. The heavy object 54 is configured, for example, as a box-shaped solid object.

In detail, the processing circuitry 10 may acquire the heavy object data indicative of the position of the heavy article mounted on the ship from its own memory, and place the heavy object 54 at a position specified by heavy object data of the heavy object 54. Alternatively, the size of the heavy object 54 may be changed according to the weight of the heavy article.

Further, the processing circuitry 10 may place the target area object 55 indicative of the target area at which the ship should arrive (for example, the arrival-at-a-shore area). The target area object 55 may also be configured as a flat surface object similarly to the ship object 53, and disposed at the height corresponding to the water surface.

In detail, the processing circuitry 10 may acquire area data indicative of the target area at which the ship should arrive from its own memory, and place the target area object 55 in the area specified by the area data.

The target area object 55 may have the same shape and size as the ship object 53, or may be the shape and size which envelops the ship object 53. Further, the grid lines may be displayed for facilitating the understanding of the parallelism on the target area object 55.

Returning to the explanation of FIG. 9, next, the processing circuitry 10 may determine a degree of matching of the ship object 53 with the target area object 55 (S13; processing as the matching determining module 16). The degree of matching is calculated, for example, based on the overlapping area of the ship object 53 and the target area object 55.

Without being limited to this configuration, the degree of matching may be calculated based on the parallelism between the ship object 53 and the target area object 55, or may be calculated based on a distance between the ship object 53 and a quay-side side of the target area object 55, for example.

Next, the processing circuitry 10 may perform another ship object placement processing (S14). FIG. 10 is a flowchart illustrating one example of a procedure of another ship object placement processing S14.

In the another ship object placement processing S14, the processing circuitry 10 may first acquire the AIS data (one example of the another ship data) from the AIS 4 (see FIG. 1) (S21).

Next, the processing circuitry 10 may determine whether another ship specified by the AIS data is a tugboat (S22). The determination of whether it is the tugboat is performed based on whether the AIS data contains an identifier indicative of the tugboat, for example. Without being limited to this configuration, the determination of whether it is the tugboat may be performed based on whether a distance between the ship and the another ship is below a threshold.

If the another ship is a tugboat (S22: YES), the processing circuitry 10 may place the another ship object 56 indicative of a tugboat based on the AIS data (S23; processing as the object placing module 15).

The placement of the another ship object 56 may be similar to the placement of the another ship object 52 (see FIG. 4) described above. That is, the another ship object 56 may be placed at a position corresponding to the positional data contained in the AIS data, with a size corresponding to length and width data, with an orientation corresponding to the heading data.

Next, the processing circuitry 10 may calculate a distance from the edge of the ship to the another ship (S24; processing as the distance calculating module 17). The position of the edge of the ship (port or starboard) may be calculated based on the positional data, the directional data, and size data of the ship, and the position of the another ship is calculated based on the AIS data.

Next, if the calculated distance is below the threshold (S25: YES), the processing circuitry 10 may add a contact mark 67 indicative of contact to a part of the ship object 53 close to the another ship object 56, and it may add an arrow 68 indicative of a traveling state of the another ship to near the another ship object 56 (S26).

The direction of the arrow 68 may indicate the heading or course of the another ship, and the size of the arrow 68 may indicate the ship speed of the another ship. Note that the contact mark 67 and the arrow 68 may be added in the extension image 44 or the synthesized image 60 after the rendering.

Note that although in the example of explanation the another ship object 56 is not placed when the another ship is not the tugboat, it is not limited to the configuration. For example, the display mode may be changed based on whether the another ship is the tugboat or not to allow one to identify whether it is the tugboat.

By the above, the another ship object placement processing S14 is finished.

Returning to explanation of FIG. 9, the processing circuitry 10 may then calculate a predicted position and a prediction posture of the ship after a given period of time, and place a predicted ship object 57 indicative of the position and posture (S15). The predicted position and prediction posture of the ship may be calculated based on data indicative of a traveling state, such as the heading and the speed of the another ship which is determined to be the tugboat.

The predicted ship object 57 may also be configured as a flat surface object similar to the ship object 53, and disposed at the height corresponding to the water surface. In the example of FIGS. 11 and 12, the predicted ship object 57 indicative of the ship translating toward the quay by being pushed by two tugboats is illustrated.

Next, the processing circuitry 10 may set the viewpoint position and the LoS direction of the virtual camera 41 in the virtual three-dimensional space 40, and generate the extension image 44 by rendering the scene which the virtual camera 41 images (S16-S17; processing as the virtual space constructing module 14 and the image generating module 19).

Next, the processing circuitry 10 may generate the synthesized image 60 (see FIG. 12) by synthesizing the generated extension image 44 with the camera image 30 captured by the actual camera 7 (see FIG. 1) (S18; processing as the image generating module 19).

Then, the processing circuitry 10 may output the generated synthesized image 60 to the display 22 (see FIG. 2) or the personal digital assistant 8 (see FIG. 1) (S19). As described above, a series of processings are finished. These processings may be repeatedly performed at a given interval.

As illustrated in FIG. 12, the synthesized image 60 may contain the ship object 53 indicative of the contour of the ship. Therefore, it becomes easier to grasp intuitively the size of the ship and the distance from the circumference object. Especially, by using the flat surface object as the ship object 53 and disposing it at the height corresponding to the water surface, it becomes easier to grasp intuitively the size of the ship near the water surface.

Further, the synthesized image 60 may also contain the heavy object 54 indicative of the heavy article loaded on the ship. Therefore, it becomes easier to grasp the position of the heavy article in the ship. Thus, an analysis of the position and the magnitude of a force which should be applied to the ship when departing from and arriving at a shore, becomes easier.

Further, the synthesized image 60 may also contain the target area object 55 indicative of the target area at which the ship should arrive. The target area object 55 is displayed, for example, adjacent to an image 35 of the quay. Therefore, an analysis of which direction the ship should be moved when departing from and arriving at a shore, and a judgment of how much the ship reaches the target area, becomes easier.

Further, the synthesized image 60 may also contain a matching indication 65 indicative of the degree of matching between the ship object 53 and the target area object 55. Therefore, a judgment of how much the ship reaches the target area becomes easier.

Further, the synthesized image 60 may also contain the another ship object 56 indicative of the tugboat. The another ship object 56 may be superimposed on an image 36 of the tugboat. Therefore, it becomes easier to grasp the position, the size, and the orientation of the tugboat.

The synthesized image 60 may also contain a distance indication 66 indicative of the distance from the edge of the ship to the another ship. Thus, by displaying the distance from the edge of the ship to the another ship which is calculated using the size data in addition to the positional data, it becomes easier to grasp a more accurate distance.

The synthesized image 60 may also contain the contact mark 67 indicative of a contact of another ship. Therefore, it becomes easier to grasp the position of the ship to which the force is applied from the tugboat.

Further, the synthesized image 60 may also contain the arrow 68 having the size corresponding to the speed of another ship, which indicates the heading or the course of the another ship. Therefore, it becomes easier to grasp the direction and the magnitude of the force applied from the tugboat.

As described above, although the embodiment of the present disclosure is described, the present disclosure is not limited to the above embodiment, and it is needless to say to the person skilled in the art that various changes may be made to the embodiment.

For example, the display may be a head mounted display which is mounted on the sailor's head. The extension image 44 may be generated based on the viewpoint position and the LoS direction of the virtual camera 41 which change in an interlocking manner at the position and the posture of the head mounted display.

Note that the synthesized image 60 where the extension image 44 and the camera image 30 are synthesized may be outputted to a non-transparent type head mounted display, and only the extension image 44 may be outputted to a transparent type head mounted display.

DESCRIPTION OF REFERENCE CHARACTERS

1 Image Generating Device
2 Radar
3 GNSS Receiver
4 AIS
5 ECDIS
6 Gyrocompass
7 Camera
8 Personal Digital Assistant
10 Processing circuitry
11 Position Acquiring Module
12 Direction Acquiring Module
13 Size Acquiring Module
14 Virtual Space Constructing Module
15 Object Placing Module
16 Matching Determining Module
17 Distance Calculating Module
18 Predicted Position Calculating Module
19 Image Generating Module
21 User Interface
22 Display
30 Camera Image
31 Image of Ship
32 Image of Another Ship
35 Image of Quay 36 Image of Tugboat
40 Virtual Three-dimensional Space
41 Virtual Camera
42 Field of View
43 Screen
44 Extension Image
51 Route Object
52 Another Ship Object
53 Ship Object
54 Heavy Object
55 Target Area Object
56 Another Ship Object
57 Predicted Ship Object
60 Synthesized Image
61 Heading Line
62 Azimuth Scale
63 Circumference Indication
64 Another Ship Information Indication
65 Matching Indication
66 Distance Indication
67 Contact Mark
67 Arrow
100 Ship Information Displaying System Terminology It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open"

terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

The invention claimed is:

1. A ship information displaying system, comprising:
   a position detector configured to detect a position of a ship and generates positional data;
   a direction detector configured to detect a heading of the ship and generates directional data;
   a memory configured to store size data indicative of a flat dimension of the ship on the basis of a detected location of the positional data in the ship;
   processing circuitry configured to:
      place a ship object indicative of the ship at a position in a virtual three-dimensional space corresponding to the positional data, with an orientation corresponding to the directional data and a size corresponding to the size data; and
      generate an image containing the ship object by rendering a scene based on a viewpoint position and a line-of-sight direction set in the virtual three-dimensional space; and
   a display configured to display the image, wherein the displayed image includes the ship object having a contour of the ship corresponding to the size data.

2. The ship information displaying system of claim 1, wherein the viewpoint position and the line-of-sight direction are set corresponding to a position and a posture of the display.

3. The ship information displaying system of claim 1, wherein the ship object is a flat surface object.

4. The ship information displaying system of claim 1, wherein the processing circuitry places the ship object at a height corresponding to a water surface.

5. The ship information displaying system of claim 1, wherein the processing circuitry places a heavy object indicative a heavy article on the ship object based on heavy object data indicative of a position of the heavy article in the ship.

6. The ship information displaying system of claim 1, wherein the processing circuitry places a target area object indicative of a target area of the ship in the virtual three-dimensional space based on area data indicative of the target area.

7. The ship information displaying system of claim 6, wherein the processing circuitry is further configured to determine a degree of matching between the ship object and the target area object.

8. The ship information displaying system of claim 1, further comprising a camera configured to image outside the ship,
   wherein the processing circuitry synthesizes an image captured by the camera with an area of the image generated by rendering, corresponding to the position and the orientation of the camera.

9. The ship information displaying system of claim 1, further comprising an another ship data receiver configured to receive another ship data containing at least positional data indicative of a position of another ship,
   wherein the processing circuitry places an another ship object in the virtual three-dimensional space based on the another ship data.

10. The ship information displaying system of claim 9, wherein the processing circuitry is further configured to calculate a distance between an edge of the ship and another ship based on the positional data, the directional data, the size data, and the another ship data.

11. The ship information displaying system of claim 10, wherein the processing circuitry adds a contact mark indicative of a contact at a part of the ship object close to the another ship object, when the distance is below a threshold.

12. The ship information displaying system of claim 1, wherein the processing circuitry places the another ship object, when the another ship data contains an identifier indicative of a tugboat.

13. The ship information displaying system of claim 1, further comprising:
   an another ship data receiver configured to receive another ship data containing at least traveling data indicative of a traveling state of another ship; wherein
   the processing circuitry is further configured to calculate a predicted position of the ship after a given period of time based on the another ship data, and
   the processing circuitry places a predicted ship object at the predicted position.

14. The ship information displaying system of claim 1, wherein the size data includes at least one of a length from the detected location to a bow of the ship, a length from the detected location to a stern of the ship, a length from the detected location to a port side of the ship, and a length from the detected location to a starboard side of the ship.

15. A method of displaying ship information, comprising the steps of:
   detecting a position of a ship and generating positional data;
   detecting a heading of the ship and generating directional data;

acquiring size data indicative of a flat dimension of the ship on the basis of a detected location of the positional data in the ship;

placing a ship object indicative of the ship at a position in a virtual three-dimensional space corresponding to the positional data, with an orientation corresponding to the directional data and a size corresponding to the size data;

generating an image containing the ship object by rendering a scene based on a viewpoint position and a line-of-sight direction set in the virtual three-dimensional space; and displaying the image, wherein the displayed image includes the ship object having a contour of the ship corresponding to the size data.

16. An image generating device, comprising:

a position acquiring module configured to acquire positional data indicative of a position of a ship;

a direction acquiring module configured to acquire directional data indicative of a heading of the ship;

a size acquiring module configured to acquire size data indicative of a flat dimension of the ship on the basis of a detected location of the positional data in the ship;

an object placing module configured to place a ship object indicative of the ship at a position in a virtual three-dimensional space corresponding to the positional data, with an orientation corresponding to the directional data and a size corresponding to the size data; and an image generating module configured to generate an image containing the ship object by rendering a scene based on a viewpoint position and a line-of-sight direction set in the virtual three-dimensional space, wherein the displayed image includes the ship object having a contour of the ship corresponding to the size data.

\* \* \* \* \*